Jan. 31, 1950     L. E. CHILSON     2,495,698
SIGNALING DEVICE
Filed Sept. 19, 1945

INVENTOR
Lloyd E. Chilson
BY
Ralph L. Chappell
ATTORNEY

Patented Jan. 31, 1950

2,495,698

UNITED STATES PATENT OFFICE 2,495,698

SIGNALING DEVICE

Lloyd E. Chilson, San Francisco, Calif.

Application September 19, 1945, Serial No. 617,414

1 Claim. (Cl. 116—152)

(Granted under the act of March 3, 1883, as amended April 30, 1928; 370 O. G. 757)

This invention relates to a signalling device and more particularly, to an audible signalling device.

Traveling cranes and similar pieces of equipment constitute a hazard to personnel who may be standing in the path of the equipment and are not made aware of its progress toward them. While a variety of signalling devices have been proposed which give warning of the approach of equipment of this character, many of these devices are subject to failure of one type or another and for that reason cannot be depended upon to give the desired warning signal.

Furthermore, the personnel using the equipment often become annoyed by the continued operation of the signal and attempt to disconnect the same if this may be accomplished without difficulty.

Accordingly, a signal is needed of the type which is not subject to mechanical or other failure, and which cannot readily be disengaged by unauthorized personnel.

It is an object of this invention to provide a signalling device which will give an audible alarm.

A more particular object is to provide a device which, on being attached to a traveling crane or to a similar traveling structure, will give a continuing audible alarm whenever the crane or other structure is caused to travel.

Still another object of this invention is to provide an alarm device of the type set forth in the foregoing object which is not subject to failure and which cannot readily be rendered inoperable.

Other objects of the invention will appear from the nature of the following description, the accompanying drawing, and the appended claim.

I have discovered that the foregoing objects can be achieved by the provision of a bell mechanism which is attached to a part of the traveling structure, as the wheel axle of a crane, which rotates whenever the structure travels and thereby causes the bell to sound its alarm.

Figure 1:
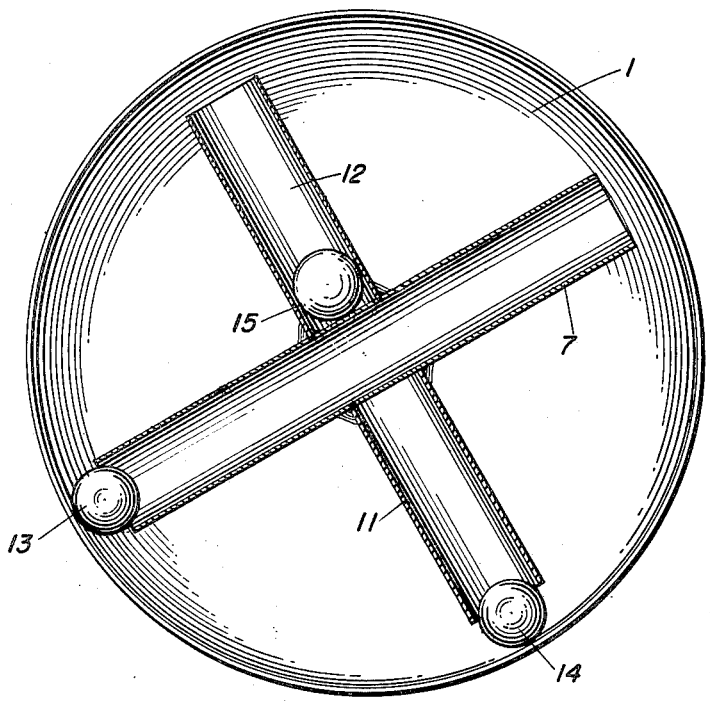
Figure 2:
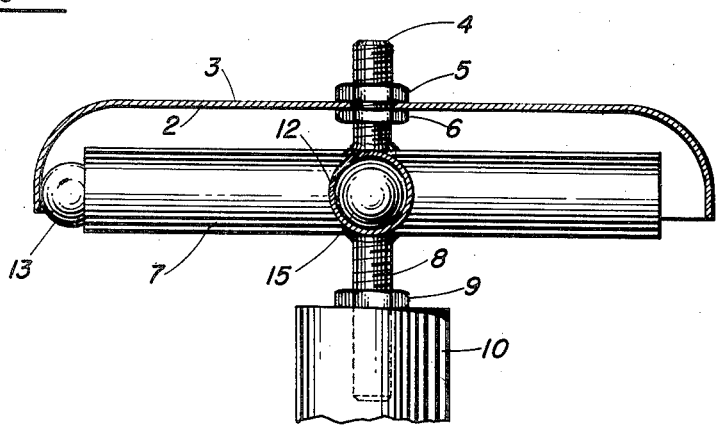

It is believed that the nature of the invention will best be understood by a consideration of the accompanying drawing wherein:

Fig. 1 is a view, partially in cross section, showing the rear, or concave, surface of the bell together with its accompanying mechanism; and Fig. 2 is a transverse cross-sectional view of the apparatus showing the mounting of the same upon an axle.

Referring more in detail to the drawing:

A cup-shaped bell which sounds an alarm signal on being struck is shown at 1, it having a concave surface 2 and a convex surface 3. A threaded spindle 4 extends through the bell 1, the bell being adjustably positioned on the spindle by means of nuts 5 and 6.

The spindle 4 is joined to the mid-portion of the side wall of a pipe 7, the joint being made midway along the length of the pipe.

A second spindle 8 is joined to pipe 7 at a point on the outer wall of the pipe opposite the position where spindle 4 is joined thereto. The outer end of spindle 8 is threaded and is provided with a nut 9. The signalling device described herein is shown as mounted on a wheel axle 10 of a traveling crane, the threaded portion of spindle 8 being screwed into a threaded socket in the wheel axle where it is locked into position by nut 9.

Pipes 11 and 12 are joined to opposite sides of pipe 7 at the mid-position thereof, and in a plane perpendicular to that of spindles 4 and 8. Enclosed within each of the pipes 7, 11, and 12 is a relatively movable ball, these balls being shown at 13, 14, and 15. The spaced relationship between the bell 1 and the pipes 7, 11, and 12, as well as the relation between the diameter of the bell and the length of the pipes, is such that while the balls in the pipes are free to strike the bell as the assembly is turned by the wheel axle 10, they cannot escape from the confines of the pipes. With continued rotation of the structure, the balls can only roll back in the pipes toward the center of the structure or against the opposite side of the bell as the case may be. It is desirable that the distance between the exits of pipes 7, 11, and 12 and the adjacent bell surface be greater than one-half the diameter of the ball employed in each pipe, though this distance should not be so great as to permit the escape of the ball.

In some instances, the edge of the bell may become cracked or worn as the apparatus is used. This can be remedied by grinding down the peripheral portion of the bell. The bell then can be moved closer to pipes 7, 11, and 12 if desired, by varying the position of the bell on the spindle 4 through adjustment of nuts 5 and 6.

The audible signal provided when the falling balls strike the bell on rotation of the assembly gives adequate alarm of the approach of the moving structure to which the bell is attached. The bell tone is particularly arresting since the tone produced when ball 13 strikes the bell is different than that provided by balls 14 and 15, this difference being attributable to the greater length of fall of ball 13.

It is apparent that the device described herein is dependent for its operation on no other factor than rotation by a member of the structure to which it is attached. Accordingly, it is impossible for the device to be rendered inoperable by mechanical or other failure. Further, once the device is mounted on the structure, unauthorized personnel find it difficult to prevent the device from giving its signal.

While I have shown but one embodiment of my invention, it is susceptible to modification without departing from the spirit of the invention. I do not wish, therefore, to be limited by the disclosures set forth, but only by the scope of the appended claim.

The invention described herein may be manufactured and used by or for the Government of the United States of America for governmental purposes without the payment of any royalties thereon or therefor.

I claim:

An alarm device adapted for attachment to and rotation with a rotatable element, said device providing an audible signal on rotation of said element, and comprising a cup-shaped bell member having an interior concave and an exterior convex surface; a horizontally positioned spindle adjustably connected to the center portion of said bell member and extending within said bell member; a first pipe member having a mid-portion thereof mounted on the other end of said spindle, and a second and a third pipe member each having one end thereof mounted against a mid-portion of said first mentioned pipe member, said pipe members having their longitudinal axes in a plane perpendicular to that of the longitudinal axis of said spindle; a relatively movable ball mounted within each of said pipe members, with the exits of said pipe members being spaced from a portion of the concave surface of the ball member a distance less than the diameter of said ball; and a second spindle joined to said first mentioned pipe member at a point opposite the junction thereof with said first mentioned spindle, said second spindle being connected to said rotatable element whereby rotation of said rotatable element causes said balls to move along said pipe members with intermittent striking of said balls against said bell to produce audible signals.

LLOYD E. CHILSON.

REFERENCES CITED

The following references are of record in the file of this patent:

UNITED STATES PATENTS

| Number | Name | Date |
| --- | --- | --- |
| 556,234 | Woodworth | Mar. 10, 1896 |
| 1,204,923 | Wood | Nov. 14, 1916 |
| 1,225,036 | Kieren | May 8, 1917 |
| 1,240,889 | Shepp | Sept. 25, 1917 |